US011359979B2

(12) United States Patent
Hurwitz

(10) Patent No.: US 11,359,979 B2
(45) Date of Patent: Jun. 14, 2022

(54) HYBRID TEMPERATURE SENSOR

(71) Applicant: Analog Devices International Unlimited Company, Limerick (IE)

(72) Inventor: Jonathan Ephraim David Hurwitz, Edinburgh (GB)

(73) Assignee: Analog Devices International Unlimited Company, Limerick (IE)

( * ) Notice: Subject to any disclaimer, the term of this patent is extended or adjusted under 35 U.S.C. 154(b) by 337 days.

(21) Appl. No.: 16/427,006

(22) Filed: May 30, 2019

(65) Prior Publication Data

US 2019/0368947 A1     Dec. 5, 2019

Related U.S. Application Data

(60) Provisional application No. 62/679,364, filed on Jun. 1, 2018.

(51) Int. Cl.
    *G01K 15/00*     (2006.01)
    *G01K 7/00*     (2006.01)

(52) U.S. Cl.
    CPC .............. *G01K 15/005* (2013.01); *G01K 7/00* (2013.01)

(58) Field of Classification Search
    CPC ........ G01K 13/00; G01K 1/26; G01K 15/005; G01K 7/00; G01K 15/00; G01K 7/01;
(Continued)

(56) References Cited

U.S. PATENT DOCUMENTS 4,993,419 A * 2/1991 Pompei ............... G01J 5/02
                                                          374/130
5,842,788 A * 12/1998 Danley .............. G01N 25/4833
                                                          374/12
(Continued)

FOREIGN PATENT DOCUMENTS

CN     108955952 A   * 12/2018
CN     110296763 A   * 10/2019 ............... G01K 1/20
(Continued)

OTHER PUBLICATIONS

"Silicon bandgap temperature sensor", Wikipedia, [Online] Retrieved from the internet on May 29, 2019: <URL: https://en.wikipedia.org/wiki/Silicon_bandgap_temperature_sensor>, (May 18, 2018), 2 pgs.

(Continued)

*Primary Examiner* — Gail Kaplan Verbitsky

(74) *Attorney, Agent, or Firm* — Schwegman Lundberg & Woessner, P.A.

(57) ABSTRACT

A hybrid temperature sensor for an integrated circuit includes two temperature sensors—an application temperature sensor for measuring temperature during normal use of the integrated circuit, and a calibration temperature sensitive element. By providing two temperature sensitive elements within the integrated circuit, it is possible to take advantage of different characteristics of temperature sensors to achieve high accuracy calibration of the application temperature sensor relatively quickly and at low cost, whilst also maintaining desirable characteristics for the application temperature sensor, such as high speed, low power consumption, high resolution, etc.

19 Claims, 11 Drawing Sheets

(58) Field of Classification Search
CPC ........ G01K 1/14; G01K 2219/00; G01K 7/24;
G01K 1/20; G01K 1/026; G01K 15/002;
G01K 3/04; G01K 3/06; G01K 7/18;
G01K 7/25; G01K 17/00; G01K 7/006;
G01K 7/015; G01K 7/427; G01K
2205/00; G01N 21/274
USPC .......................................................... 702/99
See application file for complete search history.

(56) References Cited

U.S. PATENT DOCUMENTS

| | | | | |
|---|---|---|---|---|
| 5,872,788 | A * | 2/1999 | Kreis | H04Q 9/14 370/475 |
| 5,873,029 | A * | 2/1999 | Grondahl | G01R 21/12 455/126 |
| 6,097,239 | A * | 8/2000 | Miranda, Jr | G01K 7/01 327/512 |
| 6,403,931 | B1 * | 6/2002 | Showalter | B01L 7/00 219/483 |
| 7,433,790 | B2 * | 10/2008 | Anderson | G01R 31/3167 374/171 |
| 8,575,907 | B2 * | 11/2013 | Pan | H02J 3/14 323/276 |
| 10,006,818 | B2 * | 6/2018 | Sakano | G01K 7/01 |
| 2004/0125857 | A1 * | 7/2004 | Sprock | G01K 7/20 374/185 |
| 2008/0061863 | A1 * | 3/2008 | De Barros Soldera | H01L 23/34 327/512 |
| 2013/0120930 | A1 * | 5/2013 | Temkine | G01K 7/01 361/679.47 |
| 2017/0023416 | A1 * | 1/2017 | Kim | G01K 7/01 |
| 2020/0278675 | A1 * | 9/2020 | Balathandapani | B64C 39/024 |

FOREIGN PATENT DOCUMENTS

| | | | | | |
|---|---|---|---|---|---|
| DE | 102013222316 | A1 | * | 5/2015 | ............. G01D 18/00 |
| EP | 3748319 | A1 | * | 12/2020 | ............. G01K 15/00 |
| GB | 930746 | A | * | 7/1963 | ............. G01K 1/14 |
| JP | 61269031 | A | * | 11/1986 | ........... G01R 33/561 |
| JP | H0634450 | A | * | 2/1994 | |
| JP | 2021173753 | A | * | 11/2021 | ............. G01K 15/00 |

OTHER PUBLICATIONS

Lovborg, L., "A linear temperature-to-frequency converter", Journal of Scientific Instruments, vol. 42, (1965), 5 pgs.

Makinwa, K.A.A., "Smart temperature sensors in standard CMOS", ScienceDirect, Procedia Engineering 5, (2010), 10 pgs.

Pan, Sining, et al., "A Resistor-Based Temperature Sensor With a 0.13 pJK2 Resolution FoM", IEEE Journal of Solid-State Circuits, 53(1), (Jan. 2018), 10 pgs.

Sonmez, Ugur, et al., "Compact Thermal-Diffusivity-Based Temperature Sensors in 40-nm CMOS for SoC Thermal Monitoring", IEEE Journal of Solid-State Circuits, 52(3), (Mar. 2017), 10 pgs.

Souri, Kamran, et al., "A CMOS Temperature Sensor With a Voltage-Calibrated Inaccuracy of Plus or Minus 0.15 Degrees C (3 sigma) From -55 to 125 Degrees C", IEEE Intl. Solid-State Circuits Conference, (Feb. 21, 2012), 10 pgs.

* cited by examiner

HYBRID TEMPERATURE SENSOR

CLAIM OF PRIORITY

This patent application claims the benefit of priority of U.S. Provisional Patent Application Ser. No. 62/679,364, which was filed on Jun. 1, 2018, and which is hereby, incorporated by reference herein in its entirety.

TECHNICAL FIELD

The present disclosure relates to an integrated circuit comprising an application temperature sensor and a configuration temperature sensitive element, and a method of configuring the application temperature sensor using the configuration temperature sensitive element.

BACKGROUND

There are many different types of silicon temperature sensors available today, including CMOS-compatible temperature sensors, thermal diffusivity temperature sensors, silicon bandgap temperature sensors such as BJT-based temperature sensors or MOSFET-based temperature sensors, temperature sensors based on resistors with strong temperature coefficients, etc.

SUMMARY

FIG. 1 shows an example representation of a typical temperature sensor 100, comprising a temperature sensitive element 110, a bias circuit 120 and a measurement module 130.

The temperature sensitive element 110 is some element that has a characteristic that changes with temperature, for example x=f(T). The bias circuit 120 is a circuit configured to excite the characteristic of interest from the temperature sensitive element 110. The measurement module 130 is a module that quantifies or measures the characteristic that is excited by the bias circuit and typically uses some form of reference against which the measurement is made (for example, a reference voltage, current, phase, frequency, etc, depending on the nature of the measurement).

For example, in a thermistor or resistance temperature detector (RTD) based temperature sensor, the temperature sensitive element 110 comprises a resistor that produces a change in resistance that has a characteristic that has a relationship dR/dT that may be positive or negative. The bias circuit 120 comprises a circuit configured to create a voltage across the thermistor, such as a current source configured to apply a current to the thermocouple. The measurement module 130 may comprise a circuit or component for quantifying or measuring the voltage across the thermistor, such as a voltmeter and/or analog to digital converter (ADC), in which case the temperature reading from the measurement module 130 may be a digital signal indicative of the voltage across the thermistor, and therefore indicative of temperature.

Alternatively, a thermistor may be used to make an oscillator based temperature sensor (for example as described in "A linear temperature-to-frequency converter, Lovborg Leif, Journal of Scientific Instruments, 1965, Vol. 42, Issue No. 8, pages 611-614"), where the temperature sensitive element 110 comprises a thermistor whose characteristic resistance has a relationship dR/dT. The bias circuit 120 may comprise an oscillator circuit configured to create an oscillating signal as a function of the resistance of the thermistor. The thermistor may have a dominant temperature coefficient that alters the frequency of oscillation, so the measurement module 130 may be configured to measure the frequency of oscillation. Thus, the temperature reading would be indicative of the measured frequency of oscillation, and therefore indicative of temperature. The appropriate reference for measuring in this case would be an accurate frequency source, such as a crystal.

A resistor can also create a temperature sensor through a Wheatstone bridge circuit when combined with other resistors of different temperature characteristics, or can be extracted through a Wien bridge to create a difference in phase response with temperature. Recently, integrated temperature sensors based on resistive Wien bridges have shown the best figure of merits (FOMs) for energy versus resolution (for example, in units of $J \cdot K^2$).

In a silicon bandgap temperature sensor, such as that described at https://en.wikopedia.org/wiki/Silicon bandgap temperature sensor or the BJT based temperature sensor system described in "Smart temperature sensors in standard CMOS, K. A. A. Makinwa, ScienceDirect, Procedia Engineering 5 (2010) 930-939", the temperature sensitive element 110 may comprise one or more bipolar junction transistors (BJTs), where the base-emitter voltage of each bipolar transistor is dependent on temperature. In a particular implementation, the temperature sensitive element 110 may comprise a pair of n-current density ratio-ed BJTs configured to produce a difference voltage equal to dVbe(n)/dT. The bias circuit 120 may be configured to apply a ratio-ed bias current to the BJTs, for example applying 1× current to one of the BJTs and an 8× current to the second BJT (to achieve a current ratio of 8). The measurement module 130 may be configured to measure or quantify the difference between the base-emitter voltages of the pair of BJTs, $\Delta V_{BE}$, which is indicative of the temperature. For example, the measurement module 130 may comprise an ADC, such that the temperature reading is a digital signal indicative of $\Delta V_{BE}$. In this case, the Ref used by the measurement module 130 may be a voltage reference that the ADC uses to perform the conversion. The voltage reference may be created from the same circuit that creates the dVBe characteristic. In some cases, an external reference may be introduced to improve the internal calibration.

In a thermal diffusivity (TD) temperature sensor system, such as that described in "Smart temperature sensors in standard CMOS, K. A. A. Makinwa, ScienceDirect, Procedia Engineering 5 (2010) 930-939" and "Compact Thermal-Diffusivity-Based Temperature Sensors in 40-nm CMOS for SoC Thermal Monitoring, Ugur Sonmez et al., IEEE Journal of Solid-State Circuits, page 834, Vol. 52, No. 3, March 2017", the temperature sensitive element 110 may comprise a heater and thermopile sensor embedded in a silicon substrate. The bias circuit 120 may comprise an oscillator configured to apply an oscillating signal to the heater, in order to create pulses of heat from the heater. The time delay between applying a pulse of heat at the heater and measuring the heat at the thermopile sensor has a characteristic that is relative to dtidT. Therefore, the measurement module 130 may be configured to measure that time delay, which is indicative of temperature, and may comprise an ADC to output the temperature measurement as a digital signal indicative of the measured time delay, and therefore indicative of the temperature. TD temperature sensors require significant energy to stimulate them through 'heat'.

Therefore, it can be seen that there are various different types of temperature sensors 100, with different types of temperature sensitive elements 110 having particular temperature dependent characteristics. Each different type of temperature sensitive element 110 may have particular corresponding bias circuits 120 and measurement modules 130 that are configured to extract the temperature dependent characteristic and then measure it in the form of time, voltage, current, frequency, phase, etc, as necessary depending on the temperature dependent characteristics of the temperature sensitive element 110.

This disclosure relates to a hybrid temperature sensor for an integrated circuit. The integrated circuit includes two temperature sensors—an application temperature sensor for measuring temperature during normal use of the integrated circuit, and a calibration temperature sensitive element. By providing two temperature sensitive elements within the integrated circuit, it is possible to take advantage of different characteristics of temperature sensors to achieve high accuracy calibration of the application temperature sensor relatively quickly and at low cost, whilst also maintaining desirable characteristics for the application temperature sensor, such as high speed, low power consumption, high resolution, etc.

In a first aspect of the disclosure, there is provided an integrated circuit comprising: an application temperature sensor for measuring a temperature during normal operation of the integrated circuit, wherein the application temperature sensor is configured to output an application temperature signal indicative of the temperature measured by the application temperature sensor; and a calibration temperature sensitive element for use in calibration of the application temperature sensor.

The application temperature sensor may comprise an application temperature sensitive element, wherein the calibration temperature sensitive element and the application temperature sensitive element are different types of temperature sensitive element.

The application temperature sensor is a relatively low power and/or low cost and/or high resolution and/or good resolution FoM temperature sensor. The application temperature sensitive element may comprise any one or more of: one or more resistors; one or more thermocouples; one or more BJTs; one or more MOSFETs; one or more thermal diffusivity temperature sensitive elements.

The calibration temperature sensitive element may be suitable for measuring temperature with a relatively high accuracy and/or precision and/or resolution without requiring calibration. The calibration temperature sensitive element may comprise any one or more of: one or more thermal diffusivity temperature sensitive elements; one or more BJTs; one or more resistors; one or more MOSFETs; one or more thermocouples.

The integrated circuit may further comprise a calibration bias circuit coupled to the calibration temperature sensitive element for applying a bias signal to the calibration temperature sensitive element to excite a temperature dependent characteristic of the calibration temperature sensitive element.

The integrated circuit may further comprise a bias terminal coupled to the calibration temperature sensitive element for use in applying a bias signal to the calibration temperature sensitive element to excite a temperature dependent characteristic of the calibration temperature sensitive element.

The integrated circuit may further comprise a calibration measurement module configured to generate a raw calibration temperature signal indicative of a temperature based on a measurement of a temperature dependent characteristic of the calibration temperature sensitive element.

The integrated circuit may be further configured to output the raw calibration temperature signal.

The integrated circuit may further comprise: a calibration correction module coupled to the calibration measurement module, wherein the calibration correction module is configured to: receive the raw calibration temperature signal; and generate an corrected calibration temperature signal by applying a correction to the raw calibration temperature signal; wherein the integrated circuit is further configured to output the corrected calibration temperature signal.

The integrated circuit may further comprise: a measurement terminal coupled to the calibration temperature sensitive element for use in measuring the temperature dependent characteristic of the calibration temperature sensitive element.

The application temperature sensor may be further configured to: receive a compensation signal that is based at least in part on a temperature measurement performed using the calibration temperature sensitive element; and generate the application temperature signal based at least in part on the compensation signal.

The application temperature sensor may further comprise an application measurement module configured to generate a raw application temperature signal indicative of a temperature based on a measurement of a temperature dependent characteristic of the application temperature sensitive element, wherein the application temperature sensor is configured to generate the application temperature signal based at least in part on the compensation signal and the raw application temperature signal.

The application temperature sensor may further comprise: an application correction module coupled to the application measurement module and configured to: receive the compensation signal and the raw application temperature signal; and generate the application temperature signal based at least in part on the compensation signal and the raw application temperature signal.

The integrated circuit may further comprise a compensation module configured to generate the compensation signal based at least in part on the temperature measurement performed using the calibration temperature sensitive element The application temperature sensor further comprises an application bias circuit coupled to the calibration temperature sensitive element for applying a bias signal to the application temperature sensitive element to excite a temperature dependent characteristic of the application temperature sensitive element The application temperature sensor and the calibration temperature sensitive element may be on the same semiconductor die.

The integrated circuit may further comprise: a plurality of calibration temperature sensitive elements for use in calibration of the application temperature sensor. The plurality of calibration temperature sensitive elements may be positioned around the application temperature sensor.

The integrated circuit may further comprise: a calibration temperature sensitive element characterisation structure configured to determine characterisation measurements for the calibration temperature sensitive element.

In a second aspect, there is provided a method of calibrating an application temperature sensor implemented in an integrated circuit, the method comprising: determining a calibration temperature measurement generated using a calibration temperature sensitive element implemented in the integrated circuit; and calibrating the application temperature sensor based at least in part on the calibration temperature measurement.

Determining a calibration temperature measurement may be performed within the integrated circuit.

Calibrating the application temperature sensor may comprise: determining a compensation signal based at least in part on the calibration temperature measurement; and calibrating the application temperature sensor based at least in part on the calibration temperature measurement.

BRIEF DESCRIPTION OF THE DRAWINGS

Aspects of the disclosure are described, by way of example only, with reference to the drawings, in which.

DETAILED DESCRIPTION

Figure 1:
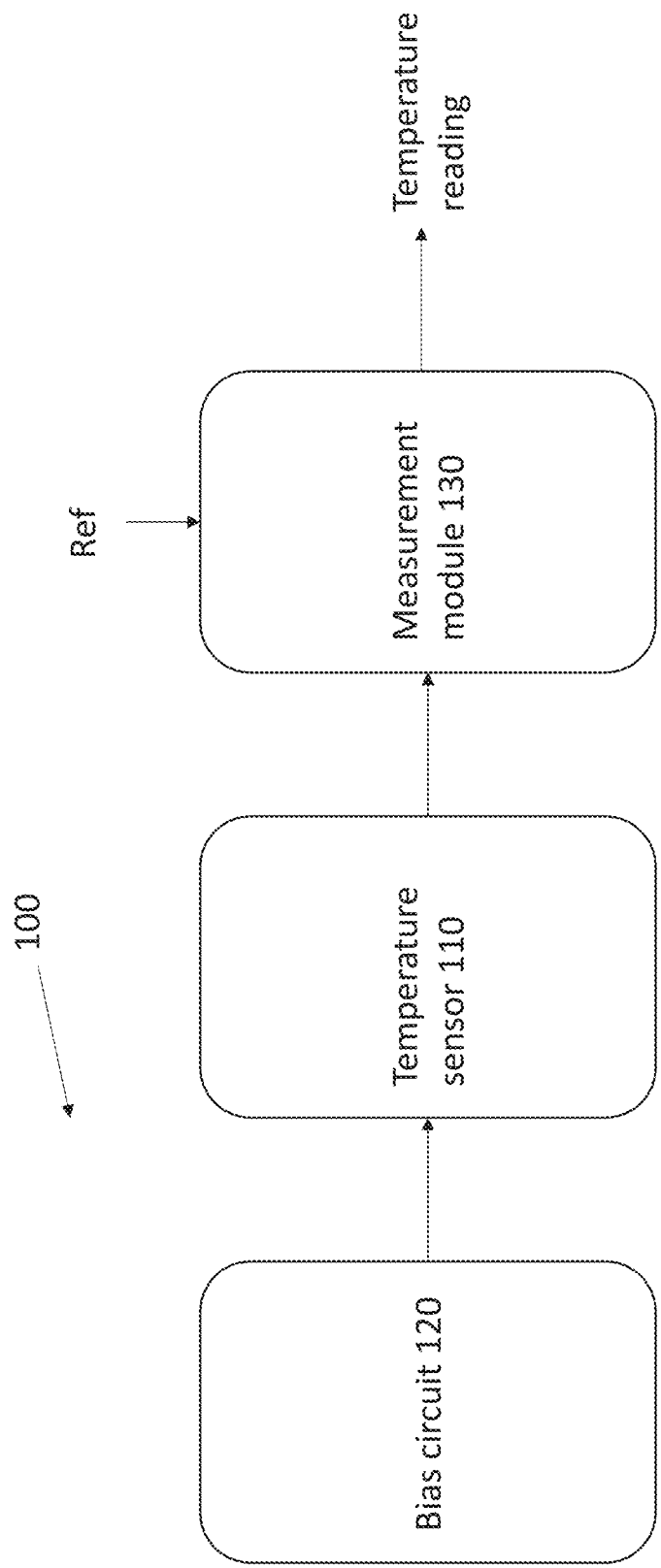
FIG. 1 shows a schematic drawing of an example temperature sensor.

After manufacture of a temperature sensor, there can be many sources of error. The errors may come in from the characteristics of the temperature sensitive element, from the bias circuit, from the measurement module and/or from changes in the device's environment (eg heating gradient). These errors may create an offset error, a first order gain error or a higher order curvature error of the temperature reading from the temperature sensor versus the actual temperature being measured. Errors may be largely systematic, for example a particular curvature of response that is largely common between all devices, or be unique to a given manufactured device, due to mismatch or production variation in parameters. Furthermore, error sources may develop with use, for example package stress when the part is soldered down. Each different type of temperature sensor, for example the different types of temperature sensor 100 identified in the 'background' section, may be subject to its own type of errors.

To achieve required levels of accuracy over the full temperature range of a temperature sensor, after manufacture of a temperature sensor it usually requires calibration and trimming, for example to correct for off-set errors, gain errors and non-linearities in the temperature sensor.

Accurate calibration and trimming of packaged silicon temperature sensors usually involves calibration oil baths and a 'Super' thermometer with temperature probes. Calibration at one known temperature point may typically be used to remove 'offset' errors. However, compensation for 1st order and beyond terms typically requires calibration at two or more known temperature points. For example, to achieve accuracy over a wide temperature range, calibration at two or even three known temperature points may be required, and/or digital domain algorithm correction may be required.

Long settling times before measurement are required due to package thermal resistance and time constant. If more than one calibration point is needed then the settling time of the oil bath must also be taken into account. Furthermore, only a limited number of parts can be calibrated and trimmed at the same time, and loading and unloading parts from the boards poses significant handling challenges. All these issues increase test time and the full factory cost.

If trimming is performed at wafer level, then the thermal time constant of the packaging is eliminated but now the temperature of the wafer must be measured accurately. On a chuck, the temperature across the surface of the wafer will not be uniform, variations of up to ±0.3° C. may occur. For wafer temperature measurements, a number of resistance temperature detectors (RTDs) distributed across the wafer can be used, but their placement, wiring and setup can be slow and cumbersome per wafer. In addition the temperature sensor system's accuracy needs to be maintained even after the changes in wafer level stress due to the sawn die being put in in a plastic package, and through reflow in the eventual application.

Figure 2:
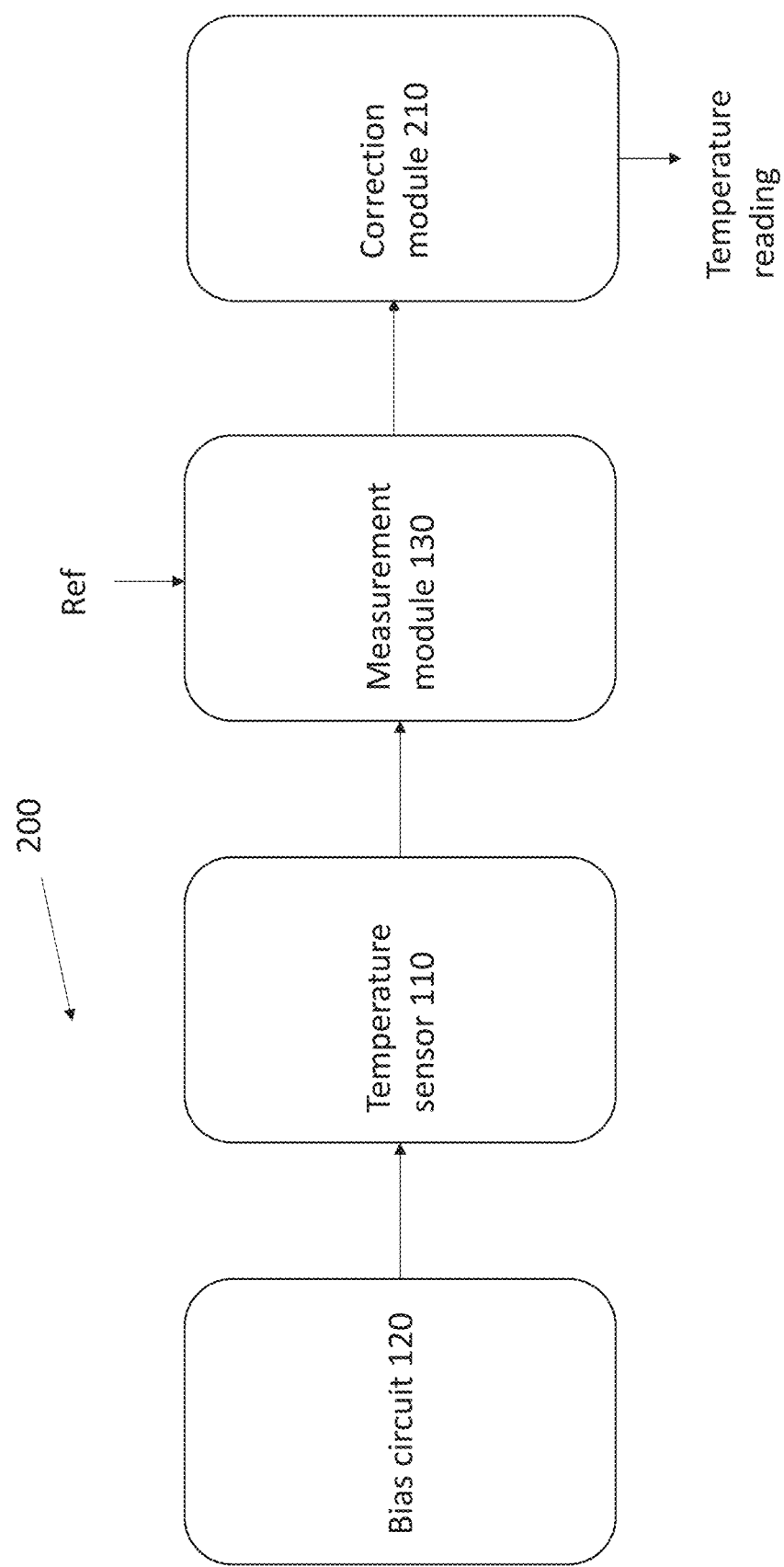
FIG. 2 shows a schematic drawing of a further example temperature sensor.

Sometimes, calibration can also involve storing in memory one or more correction factors to be applied in digital or analog at the output of the measurement module before outputting the corrected temperature measurement. It may also involve a fitting model (for example, a polynomial) to minimise error and sometimes an additional correction factor needs to be applied to compensate for things like self heating in the environment of the calibration test, or due to the socket thermal characteristics during calibration testing compared to when the device is soldered down. For example, FIG. 2 shows an example temperature sensor 200 that comprises a correction module 210 that is programmed during calibration to correct the output of the measurement module 130, for example using a polynomial fit determined during calibration at one or more known temperatures.

Thus, it can be seen that accurate calibration is costly, as it takes time and expensive equipment, especially where a high degree of accuracy is required from the temperature sensor. In particular, it can be very costly and slow to control the ambient environment to accurate calibration temperatures, especially where multipoint calibration is required.

The inventors have recognised that different temperature sensors have different characteristics, such as different operating temperature ranges, operating voltage ranges, power consumptions, frequency of operation, resolutions, precisions, accuracies, noise/drift (in the short and long term) and cost (for example, silicon, test, package and yield costs). By making best use of these different characteristics the time and cost of calibration may be reduced by reducing the number of known temperature calibration points required, or even eliminating known temperature point calibration entirely.

For example, the inventors have recognised that some applications, such as vital signs monitoring, may require a temperature sensor that has a high degree of accuracy over a small operating temperature range. Furthermore, because they may need to make regular temperature measurements in potentially low power environments, they may also need to be low power, good resolution FoM and potentially also low cost. There are not currently any temperature sensors that can be manufactured, calibrated and trimmed to a high degree of accuracy at a low cost and also operate at low power. For example, a wien bridge resistor temperature sensors or thermistor based temperature sensors may be operated with relatively low power/good resolution FoM (for example, a resolution FoM of below 1 pJ·K$^2$, or below 0.2 pJ·K$^2$, such as the resistor based temperature sensor with a 0.13 pJ·K$^2$ resolution FoM as disclosed in "A Resistor-Based Temperature Sensor With a 130 pJ·K$^2$ Resolution FoM, Sining Pan, et al., IEEE Journal of Solid-State Circuits, page 164, Vol. 53, No. 1, January 2018) and may be manufactured in large volumes at low cost. However, their initial accuracy can be very poor as the starting resistor value varies significantly with manufacturing, and their overall accuracy over a wide range may be very low unless extensive multipoint calibration is undertaken, which may be very time consuming and costly.

However, the inventors have developed a solution to these conflicting requirements by developing a hybrid temperature sensor system. The inventors have recognised that some temperature sensors have a relatively high degree of absolute accuracy (for example, less than 0.2° C.) at initial manufacturing without requiring calibration. For example, the accuracy of thermal diffusivity (TD) temperature sensors depends mostly on silicon purity/repeatability and the control of relatively large dimensions. Likewise, BJT based temperature sensors are typically relatively accurate at manufacture, provided the paired BJTs are well matched, there is good process control during manufacture and an accurate reference is used for the measurement module. For both of these sensor types, at least one of power consumption, speed of operation and/or resolution may be poor and not meet the sensor requirements. However, the inventors have realised that by implementing two temperature sensors within an integrated circuit, one temperature sensor being the application temperature sensor that meets all of the requirements demanded by the application (for example, high speed, low power consumption, high resolution, etc) and the other temperature sensor being a calibration temperature sensor that is relatively accurate at initial manufacture (but may not meet the other requirements demanded by the application), the calibration temperature sensor may be used to calibrate the application temperature sensor, without requiring an expensive and slow highly exact temperature point calibration processes.

For example, at initial manufacture, a calibration temperature sensor such as a TD temperature sensor or BJT based temperature sensor may be able to measure ambient temperature (for example, 21° C.±2° C.) to a relatively high degree of accuracy (for example, within about 0.2° C., or within about 0.1° C., or within about 0.05° C.). The temperature measurement from the calibration temperature sensor may then be used to perform approximate single or multi temperature point calibration of the application temperature sensor, which may be sufficient to bring the application temperature sensor to within the required accuracy for the application. This can be performed quickly in an environment without tight temperature control (for example, in an environment at a temperature between about 19-23° C.), which should significantly reduce calibration time and cost. Furthermore, because the calibration temperature sensor need only be operated during initial calibration (and optionally during further occasional calibration in the field), power consumption during application use should still be low enough to meet the application requirements.

Figure 3:
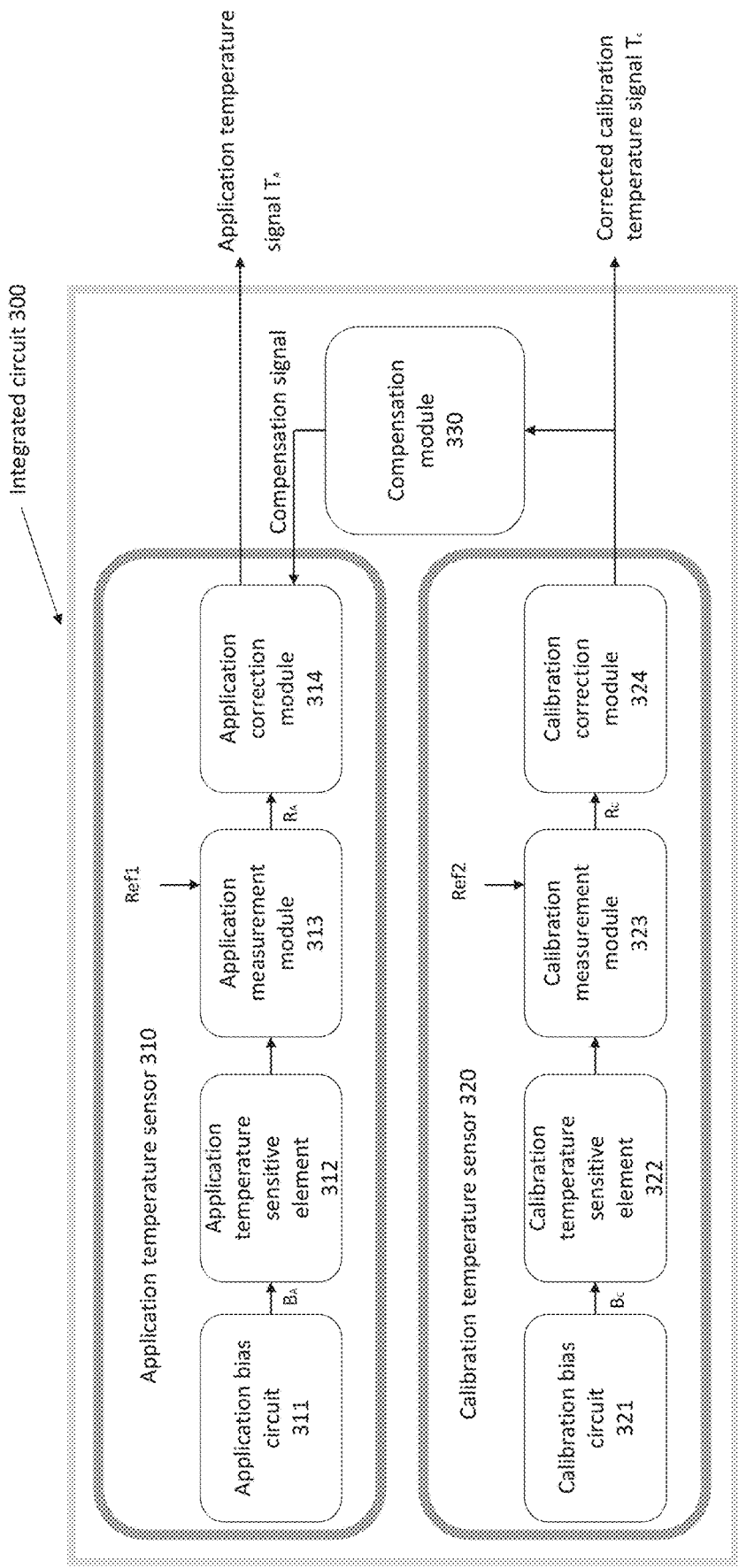
FIG. 3 shows an example integrated circuit (IC) 300 in accordance with a first aspect of the present disclosure.

FIG. 3 shows an example integrated circuit (IC) 300 in accordance with a first aspect of the present disclosure. The IC 300 comprises an application temperature sensor 310 comprising an application bias circuit 311, an application temperature sensitive element 312, an application measurement module 313 and an application correction module 314. The application bias circuit 311 supplies a bias signal BA to the application temperature sensitive element 312 and the application measurement module 313 outputs a raw application temperature signal $R_A$ to the application correction module 314, which in turn outputs the application temperature signal $T_A$ that is indicative of a temperature measured by the application temperature sensor 310. The operation of the application temperature sensor 310 is essentially the same as that described above with reference to FIG. 2. The application temperature sensor 310 is configured to be used to measure temperature in the field for a particular application, for example the application may be vital signs monitoring, or temperature monitoring in a factory, etc, etc. The application temperature sensor 310 may be relatively low power and/or low cost and/or high speed, depending on the application requirements. For example, it may be a Wien bridge resistor based temperature sensor and/or a thermocouple based temperature sensor and/or a thermistor based temperature sensor and/or a MOSFET based temperature sensor, or any other suitable temperature sensor to meet the application requirements.

The IC 300 also comprises a calibration bias circuit 321, a calibration temperature sensitive element 322, a calibration measurement module 323 and a calibration correction module 324. The calibration bias circuit 321 supplies a bias signal $B_C$ to the calibration temperature sensitive element 322 and the calibration measurement module 323 outputs a raw application temperature signal $R_C$ to the calibration correction module 324, which in turn outputs the corrected calibration temperature signal $T_C$ that is indicative of a temperature measured by the calibration temperature sensor 320. The operation of the calibration temperature sensor 320 is essentially the same as that described above with reference to FIG. 2.

The calibration correction module 324 may be configured to apply a correction to the calibration measurement module 323 based on previous experimental data for the type of sensor that the calibration temperature sensor 320 is (for example, TD temperature sensors, BJT based temperature sensors, etc). Alternatively, the calibration correction module 324 may be omitted, for example if the raw calibration temperature signal $R_C$ is sufficiently accurate without correction, in which case the raw calibration temperature signal $R_C$ would be output to the compensation module 330.

In the configuration represented in FIG. 3, the compensation module 330 is configured to receive the corrected calibrated temperature $T_C$ (although it may alternatively receive the raw calibration temperature signal $R_C$) and generate a compensation signal based at least in part on the corrected calibrated temperature $T_C$ (or raw calibration temperature signal $R_C$). Although not represented in FIG. 3, the compensation module 330 may optionally also receive the application temperature signal $T_A$ and generate the compensation signal based at least in part on the corrected calibrated temperature $T_C$ (or raw calibration temperature signal $R_C$) and the application temperature signal $T_A$. Whether or not the application temperature signal $T_A$ is used in the determination of the compensation signal may depend, for example, on the type of correction that the application correction module 314 is performing and/or the particular configuration of the compensation module 430 and/or the type of sensor that the application temperature sensor 310 and/or the calibration temperature sensor 320 is, etc. The compensation signal may take any suitable form depending on the configuration of the application correction module 314. For example, it may represent a single value (for example, so the application correction module 314 may correct an offset in the raw application temperature signal $R_A$), or a polynomial (for example, so the application correction module 314 may correct a first order error in the raw application temperature signal $R_A$), etc. In this way, the compensation signal may be used by the application correction module 314 to bring the application temperature signal $T_A$ to be indicative of a temperature that more closely aligns with the temperature indicated by the corrected calibration temperature signal $T_C$ (or raw calibration temperature signal $R_C$). Thus, the application temperature sensor 310 can be calibrated using the calibration temperature sensor 320.

The application correction module 314 may optionally also apply learnt correction factors for characteristics such as self heating. Whilst a single point temperature calibration may be carried out (for example, at 21° C.±2° C.), optionally multipoint temperature calibration may be carried out, either by virtue of a temperature change being applied internally to the IC 300 (for example, by passing current through an internal diode) or externally to the IC 300. It will be appreciated that whilst multipoint calibration may increase calibration time and costs, because the calibration temperature sensor 320 can produce a relatively accurate measure of temperature without prior calibration, it is not so important to control temperature to a high degree of accuracy, since the calibration temperature sensor 320 should provide a sufficiently accurate measure of whatever temperature has been approximately set for each temperature point. Consequently, calibration of the application temperature sensor 310 may still be performed more quickly and cheaply than traditional calibration methods.

Additionally or alternatively, calibration may comprise making two or more measurements using the calibration temperature sensor 320 whilst driving the calibration temperature sensor 320 at a different power level for each measurement. This may be particularly useful where the calibration temperature sensor 320 is a TD sensor, since the power at which the TD sensor is driven in order to make a calibration temperature measurement may affect the level of self-heating. Therefore, taking multiple calibration temperature measurements at different power levels may help in the determination of correction factors of self heating characteristics.

Calibration may be performed soon after manufacture of the IC 300. After the initial calibration, the calibration temperature sensor 320 and compensation module 330 may be left redundant with only the application temperature sensor 310 being used 'in the field'. Alternatively, the calibration temperature sensor 320 and compensation module 330 may be used at least once (for example, periodically or intermittently) in the field in order to linearize/re-calibrate/check the application temperature signal $T_A$ and may therefore offer a degree of functional safety testing to the accuracy of the application temperature signal $T_A$. The act of checking in the field periodically may form a suitable functional safety check in the application. Additionally, or alternatively, the calibration temperature sensor 320 may provide a suitable redundant measurement capability if it is decided in the field that there is something wrong with the application temperature signal $T_A$ from the application temperature sensor 310.

Whilst FIG. 3 shows the corrected calibration temperature signal $T_C$ being output from the IC 300, in an alternative configuration the corrected calibration temperature signal $T_C$ may remain internal to the IC 300 for use only by the compensation module 330.

Figure 4:
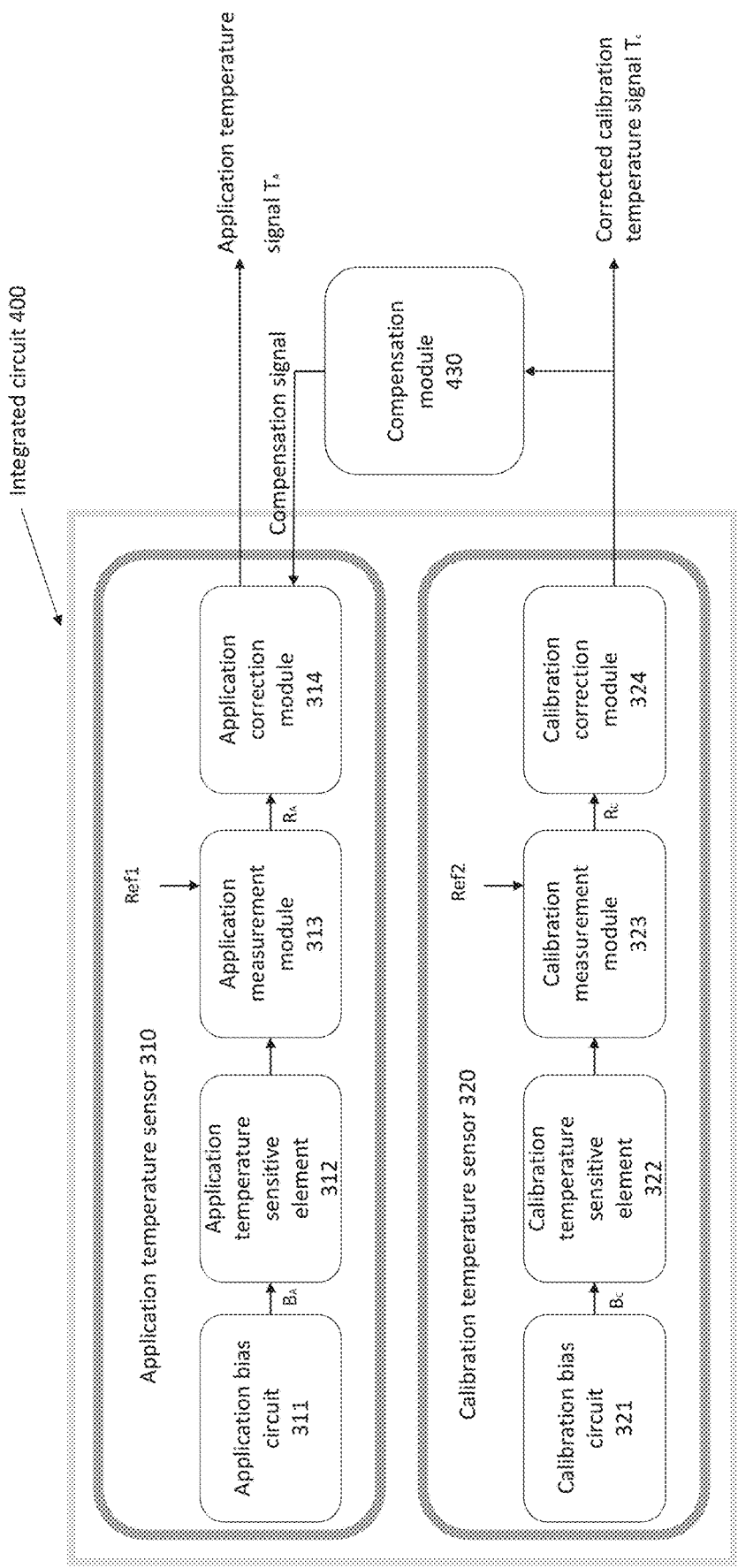
FIG. 4 shows an example integrated circuit (IC) 400 in accordance with a second aspect of the present disclosure.

FIG. 4 shows a schematic representation of an IC 400 in accordance with a second aspect of the present disclosure. The IC 400 is very similar to IC 300, except the compensation module 430 is not included in the IC 400. Instead, the compensation module 430 is located off-chip, for example in a test rig/environment, and the IC 400 is configured to include a further input terminal for receiving the compensation signal to the application correction module 314.

Figure 5:
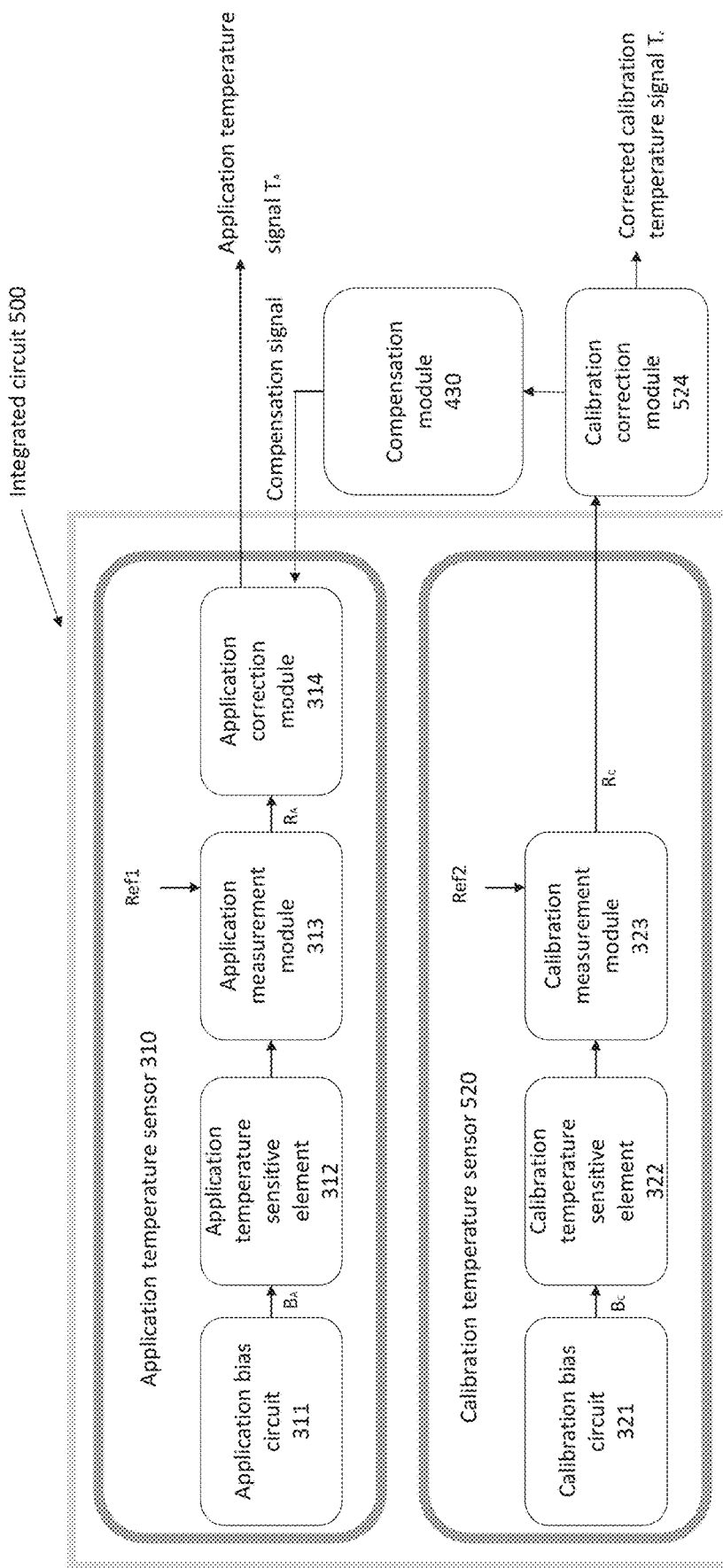
FIG. 5 shows an example integrated circuit (IC) 500 in accordance with a third aspect of the present disclosure.

FIG. 5 shows a schematic representation of an IC 500 in accordance with a third aspect of the present disclosure. The IC 500 is very similar to IC 400, except the calibration temperature sensor 520 does not include the calibration correction module 524, which is instead located outside of the IC 500, for example in a test rig/environment. In an alternative to this configuration, the calibration correction module 524 may be omitted entirely, with the raw calibration temperature signal $R_C$ instead being output to the compensation module 430.

Figure 6:
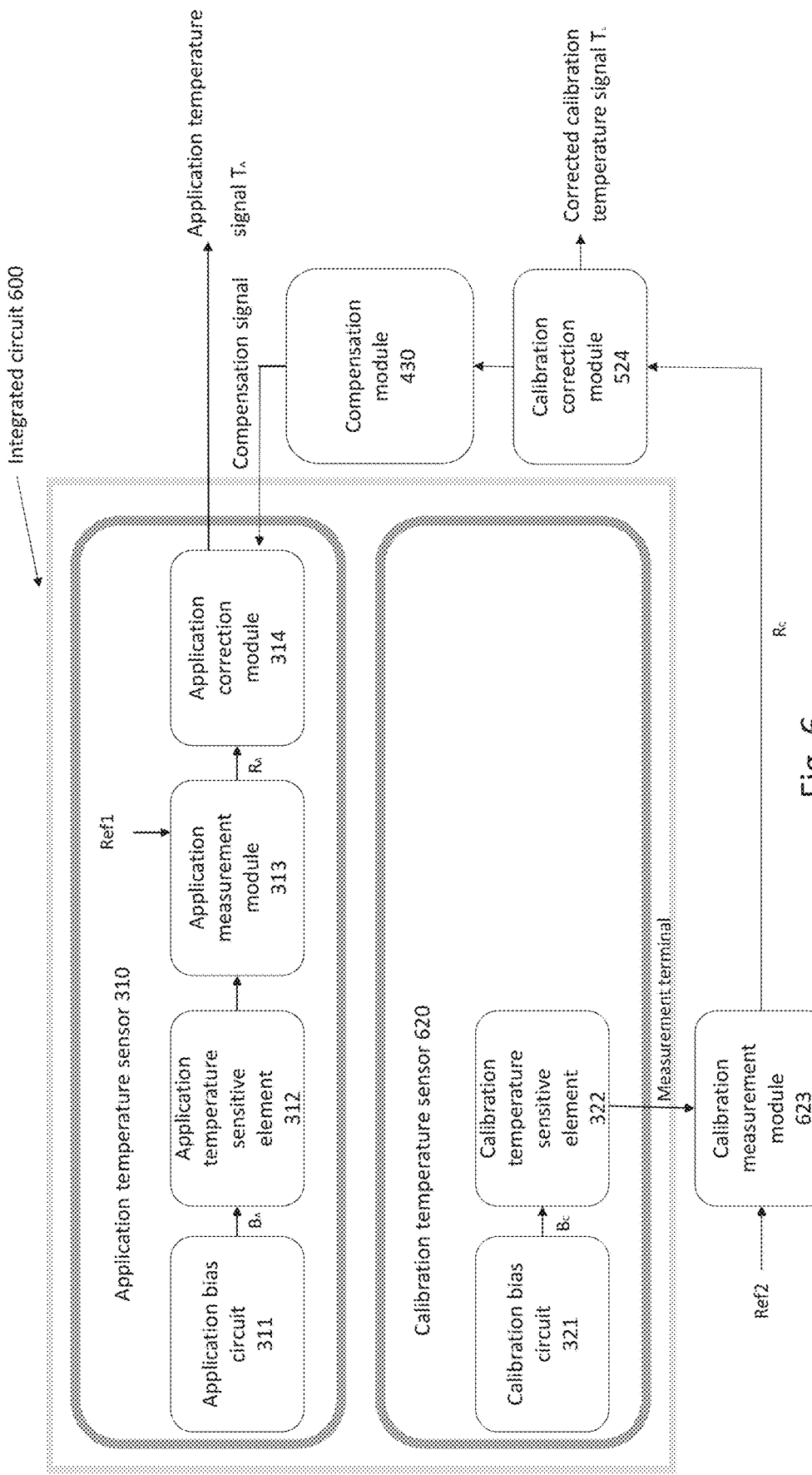
FIG. 6 shows an example integrated circuit (IC) 600 in accordance with a fourth aspect of the present disclosure.

FIG. 6 shows a schematic representation of an IC 600 in accordance with a fourth aspect of the present disclosure. The IC 600 is very similar to IC 500, except the calibration temperature sensor 620 does not include the calibration measurement module 623, which is instead located outside of the IC 600, for example in a test rig/environment. The IC 600 is therefore configured to include a measurement terminal coupled to the calibration temperature sensitive element 322, using which the calibration measurement module may measure the temperature dependent characteristic of the calibration temperature sensitive element 322.

Figure 7:
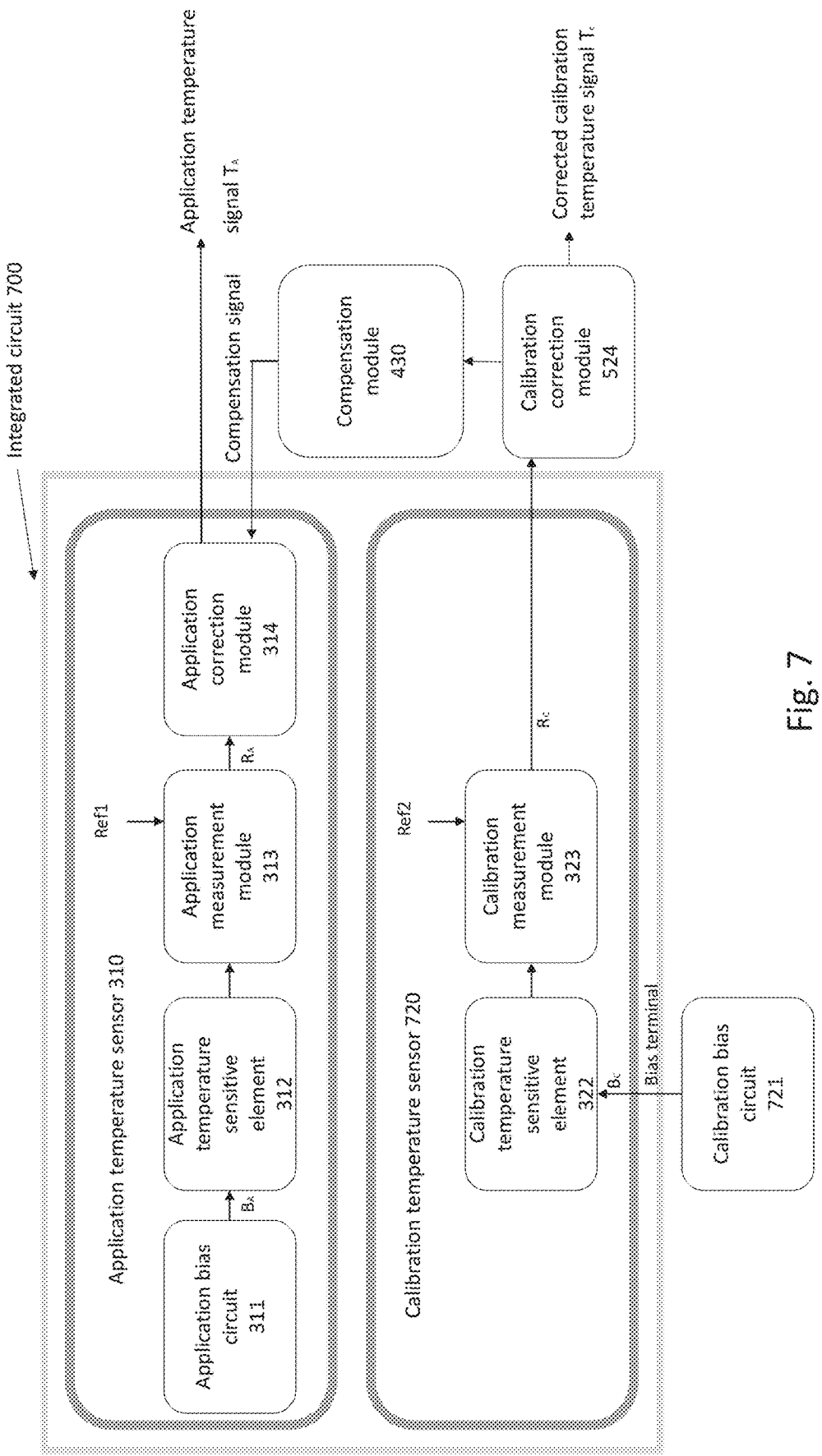
FIG. 7 shows an example integrated circuit (IC) 700 in accordance with a fifth aspect of the present disclosure.

FIG. 7 shows a schematic representation of an IC 700 in accordance with a fifth aspect of the present disclosure. The IC 700 is very similar to IC 500, except the calibration temperature sensor 720 does not include the calibration bias circuit 721, which is instead located outside of the IC 700, for example in a test rig/environment. The IC 700 is therefore configured to include a bias terminal coupled to the calibration temperature sensitive element 322 for use by the calibration bias circuit 721 to apply the bias signal $B_C$ to the calibration temperature sensitive element 322 to excite a temperature dependent characteristic of the calibration temperature sensitive element 322, using which the calibration measurement module 323 may measure the temperature dependent characteristic of the calibration temperature sensitive element 322.

Figure 8:
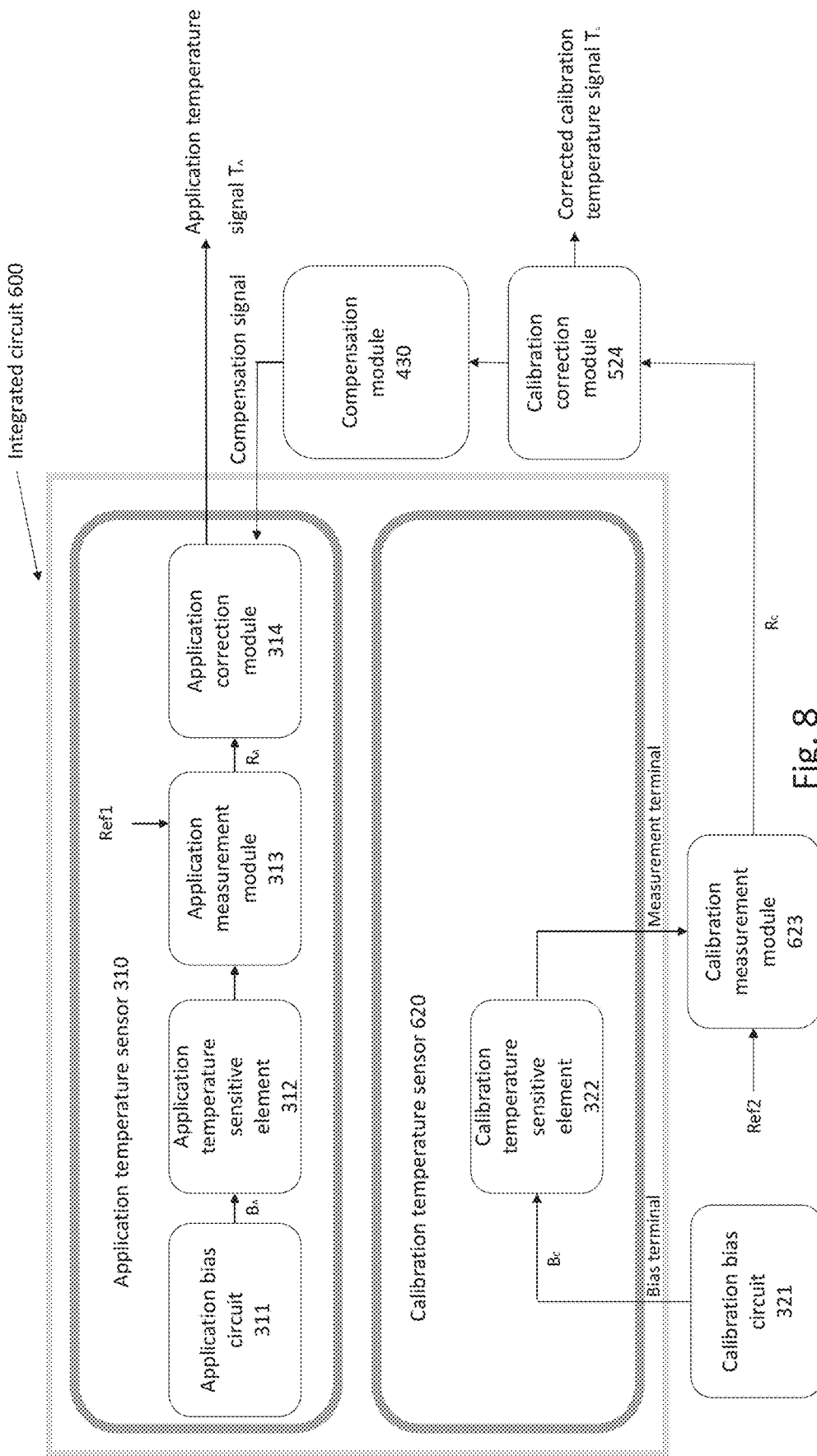
FIG. 8 shows an example integrated circuit (IC) 800 in accordance with a sixth aspect of the present disclosure.

FIG. 8 shows a schematic representation of an IC 800 in accordance with a fifth aspect of the present disclosure. The IC 800 is very similar to ICs 600 and 700, except both the calibration bias circuit 721 and the calibration measurement module 623 are located off the IC 800.

Each of the ICs represented in FIGS. 4-8 require at least some off IC components in order to perform a calibration of the application temperature sensor 310. Consequently, for these implementations, on-going periodic/intermittent calibrations in the field may not be possible. Instead, calibration may be possible only in a test environment. However, these configurations may benefit from simplified IC design and reduced space being required on the IC. Furthermore, more accurate/reliable components may be used for each of the off-IC circuits and/or modules, since those more accurate/reliable components may then be used to calibrate many different application temperature sensors 310 over time.

Consequently, it may be possible to carry out a more accurate calibration of the application temperature sensor 310.

The skilled person will readily appreciate that various alterations or modifications may be made to the above described aspects of the disclosure without departing from the scope of the disclosure.

For example, whilst each of Ref1 and Ref2 are represented in each of the Figures as being reference signals internal to the ICs, in an alternative implementation Ref1 and/or Ref2 may be generated off-IC and supplied to the application measurement module 313 and/or configuration measurement module 323 via input terminals in the IC.

Additionally or alternatively, the application temperature sensor 310 and the configuration temperature sensor may share at least some resources. For example, Ref1 and Ref2 may be the same signal. Additionally or alternatively, the calibration temperature sensor and the application temperature sensor may share a measurement module.

Figure 9:
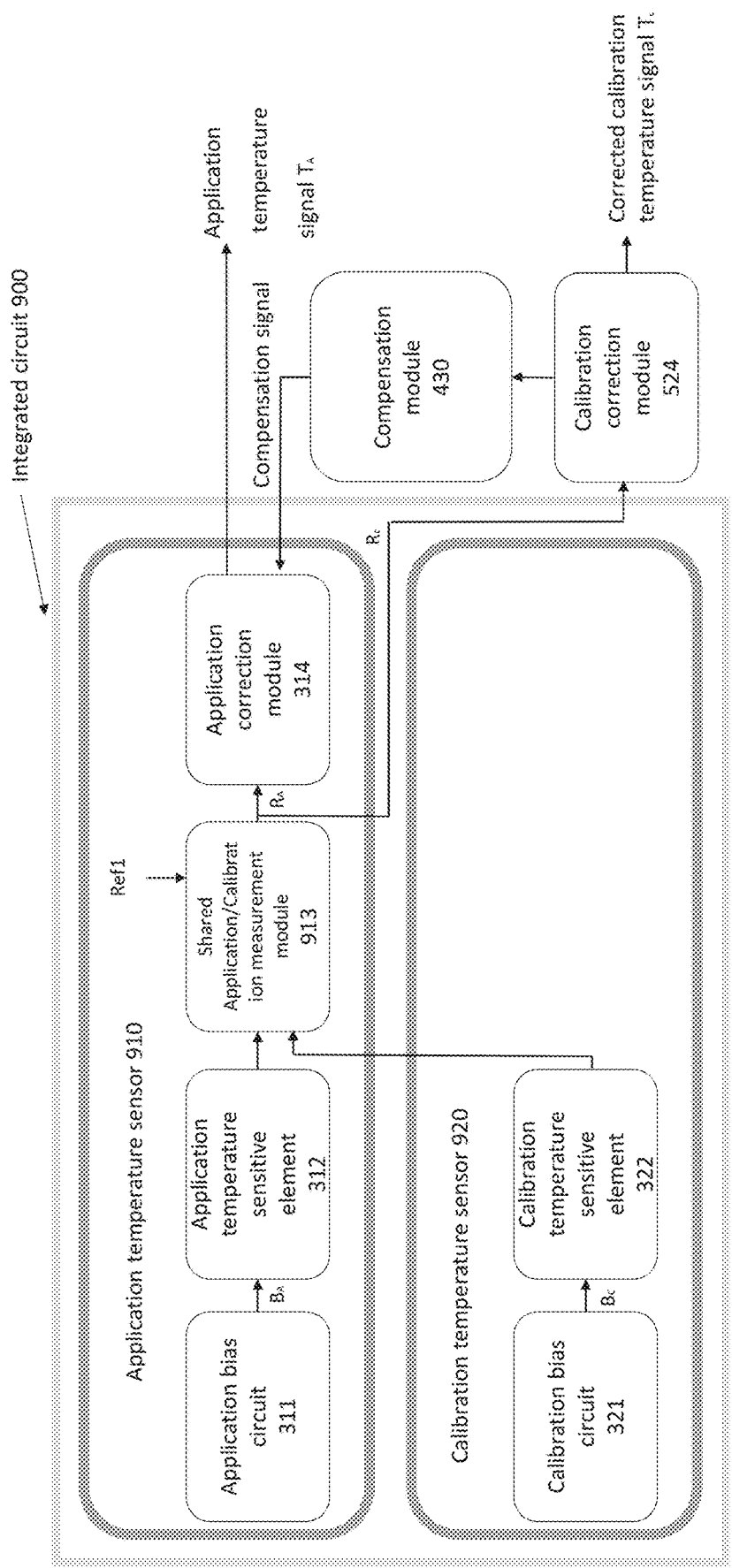
FIG. 9 shows an example integrated circuit (IC) 900 in accordance with a sixth aspect of the present disclosure.

For example, FIG. 9 shows a schematic representation of an IC 900 in accordance with a sixth aspect of the present disclosure. The calibration temperature sensor 920 does not comprise a measurement module, but instead uses the shared application/calibration measurement module 913 that is part of the application temperature sensor 910. The shared application/calibration measurement module 913 may time multiplex its output of the raw calibration temperature signal $R_C$ and the raw application temperature signal $R_A$, or may have two outputs, one for each of the raw calibration temperature signal $R_C$ and the raw application temperature signal $R_A$. Whilst the shared calibration application/calibration measurement module 913 is represented as being part of the application temperature sensor 910 in this aspect, it may alternatively be part of the calibration temperature sensor 920, or may be located anywhere else in the IC 900. Furthermore, whilst the componentisation module 430 and the calibration correction module 524 are in their off-IC arrangement in this aspect of the disclosure, in an alternative the componentisation module 430 and/or the calibration correction module 524 may be part of the IC 900 (for example, as represented in FIGS. 3 and 4). Furthermore, a single shared application/calibration correction module may alternatively be used, with either two outputs (one for each of the application temperature signal $T_A$ and the correction calibration temperature signal $T_C$), or a single, time multiplexed output.

Figure 10:
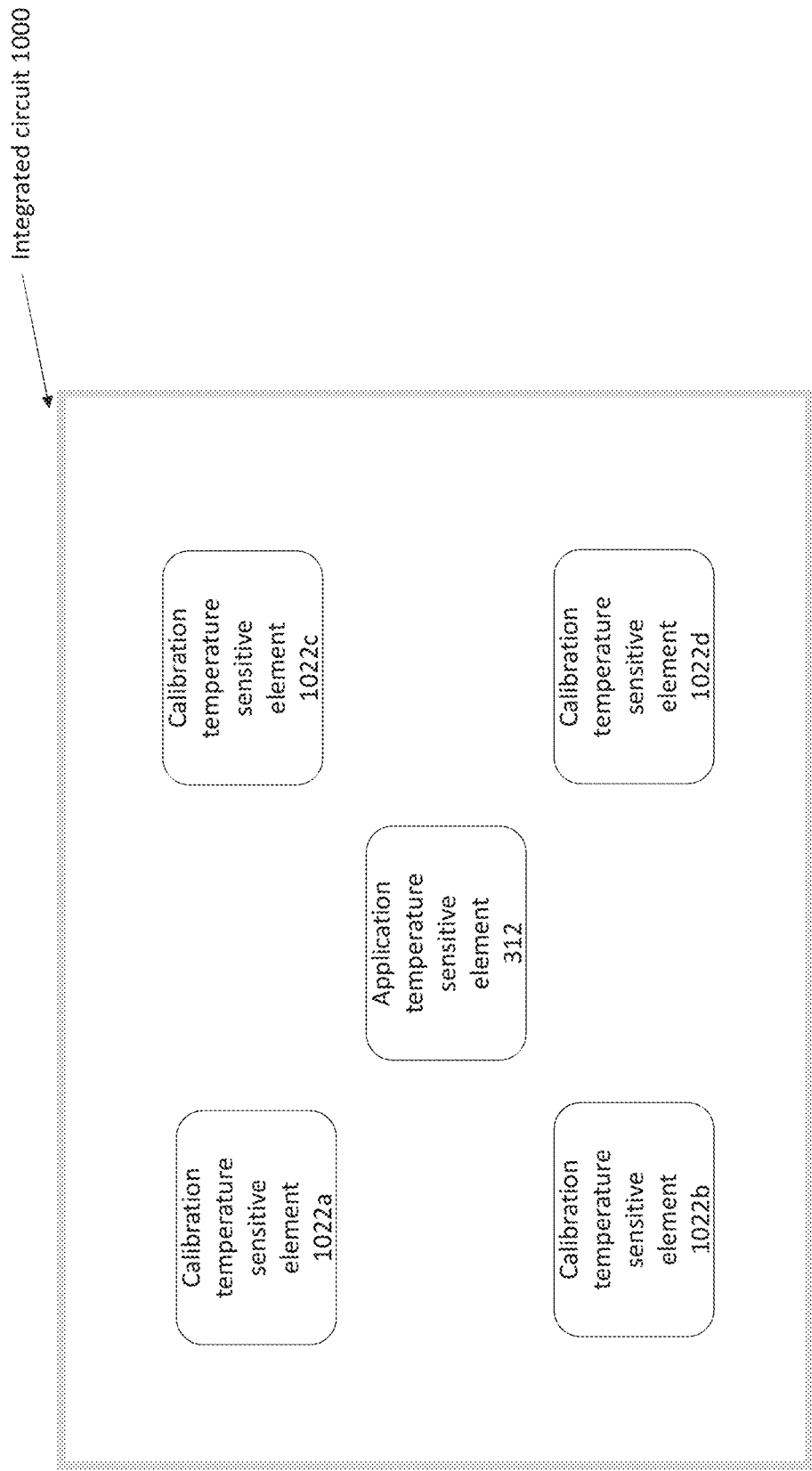
FIG. 10 shows an example integrated circuit (IC) 1000 in accordance with a sixth aspect of the present disclosure.

Furthermore, there may be multiple instances of calibration and/or application temperature sensors, or temperature sensitive elements, on the IC. For example, FIG. 10 shows a schematic representation of an IC 1000 in accordance with a tenth aspect of the present disclosure. The IC 1000 comprises a plurality of calibration temperature sensitive elements 1022a-1022d, positioned around the application temperature sensitive element 312. Other elements/parts of the temperature sensors are not represented in FIG. 10 for the sake of clarity. Calibration temperature measurements may be taken, in parallel or sequentially, using the calibration temperature sensitive elements, the results of which may then be combined for calibration of the application temperature sensor. Where there are a plurality of calibration and/or application temperature sensors or temperature sensitive elements, each may be slightly different. For example, one or more of the plurality of calibration temperature sensitive elements 1022a-1022d may be of a different type from the other calibration temperature sensitive elements 1022a-1022d, or may be of the same type but slightly different configuration/size, etc (for example, if each of the calibration temperature sensitive elements 1022a-1022d are TD temperature sensitive elements, they may each have different spacing between the heater and thermopile sensor, etc). In this way, interpolation may be performed between the measurements from each temperature sensitive element, thereby improving the accuracy of the calibration temperature measurements.

The application temperature sensor 310 and the configuration temperature sensitive element 322 (and optionally also other circuits/modules of the configuration temperature sensor and/or configuration module that are included in the IC) may be formed on the some die (for example next to each other, or interleaved, or gradient interleaved) or on separate dies within the IC.

In a further alternative, IC 300 may be configured also to have a bias terminal and/or measurement terminal such that more accurate and reliable off-IC calibration bias circuits and/or calibration measurement modules and/or calibration correction modules and/or compensation modules may be used in the test environment for initial calibration. For further calibrations in the field, the calibration temperature sensor 320 and the compensation module 230 may be used to perform the further calibrations.

Figure 11:
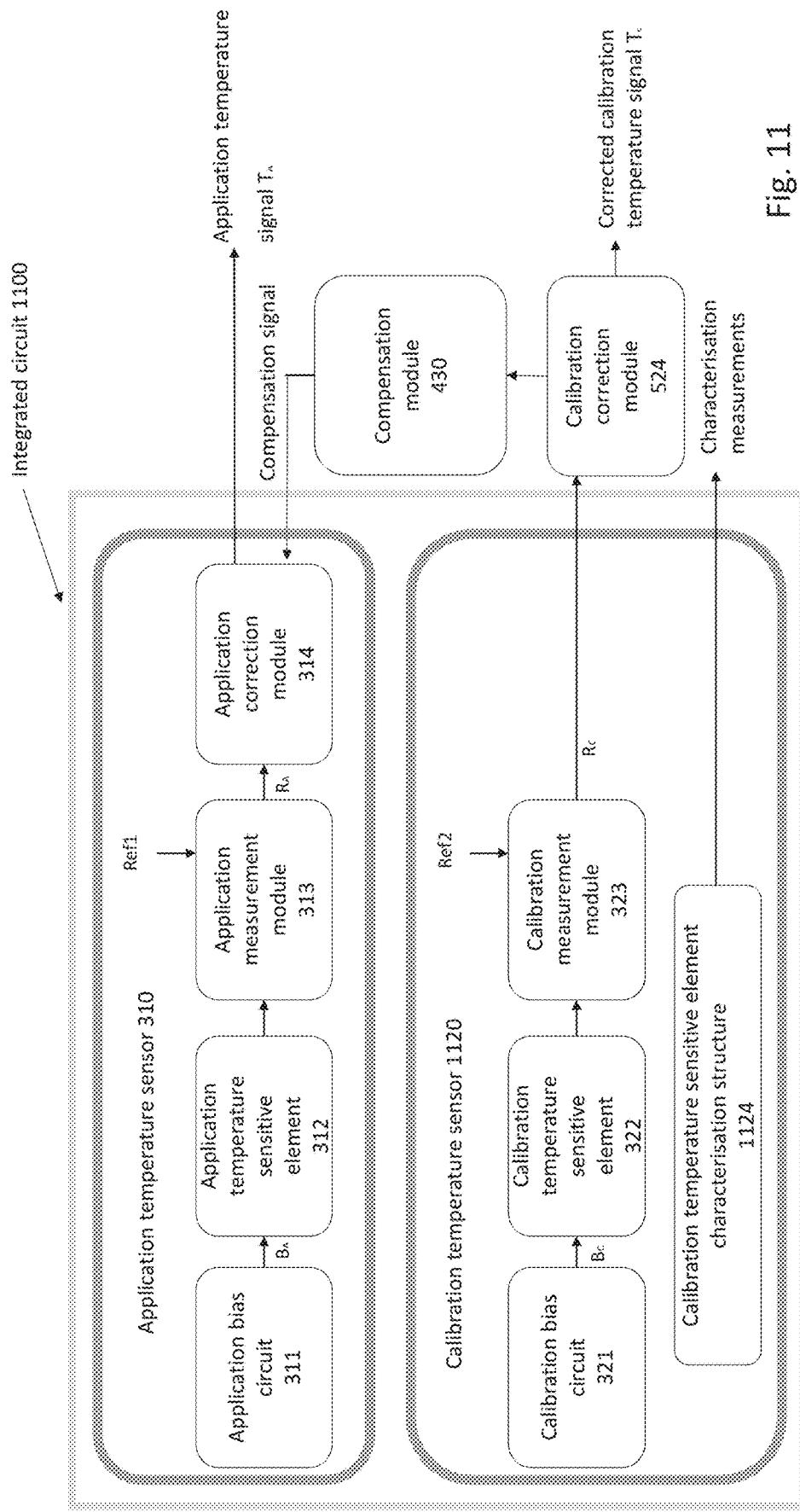
FIG. 11 shows an example integrated circuit (IC) 1100 in accordance with a sixth aspect of the present disclosure.

In a further alternative, the calibration temperature sensor and/or application temperature sensor may further comprise a characterisation element with a characterisation capability. FIG. 11 shows an example calibration temperature sensitive element characterisation structure 1124 in the calibration temperature sensor 1120 in accordance with an eleventh aspect of the present disclosure. The calibration temperature sensitive element characterisation structure 1124 may be configured to generate characterisation measurements that are indicative of the character of the calibration temperature sensitive element 322. For example, if the calibration temperature sensitive element 322 comprises a BJT(s), the calibration temperature sensitive element characterisation structure 1124 may configure and/or measure the BJT(s) β and/or Early voltage and/or parasitic impedances. These characterisation measurements may be used by an off-IC characterisation calculation module to calculate characteristics of the calibration temperature sensitive element 322, for example to perform curve tracing of the characteristics, etc. This characterisation may then be used by the calibration correction module 524 and/or the compensation module 430 to enable a better fit of the corrected calibration temperature signal $T_C$ and/or the application temperature signal $T_A$ to the actual ambient temperature. Whilst this aspect of the disclosure is represented in FIG. 11 in the context of the arrangement of the third aspect (FIG. 5), the calibration temperature sensitive element characterisation structure 1124 may alternatively form part of any of the aspects represented in FIGS. 3-10, and may be part of the IC (for example, part of the calibration temperature sensor, or part of the application temperature sensor, or any other part of the IC), or may be off-IC.

Whilst in each of the aspects represented in FIGS. 3-11, each input and output to the IC typically has its own input or output terminal, it will be appreciated that two or more inputs/output may share an input/output terminal (pin) of the IC.

Whilst some particular examples of types of application temperature sensors and calibration temperature sensors are given above, any suitable types of temperature sensors may be used based on the application and calibration requirements.

The invention claimed is:

1. An integrated circuit comprising:
an application temperature sensor for measuring a temperature during normal operation of the integrated circuit, wherein the application temperature sensor is configured to output an application temperature signal indicative of the temperature measured by the application temperature sensor;
a calibration temperature sensitive element for use in calibration of the application temperature sensor; and
a calibration bias circuit configured to:
apply a first bias signal to the calibration sensitive element to produce a first calibration temperature measurement at a first power level; and
apply a second bias signal to the calibration sensitive element to produce a second calibration temperature measurement at a second power level, wherein the first power level is different from the second power level; and
an application correction module configured to determine a correction factor based at least in part on the first and second calibration temperature measurements and apply the correction factor to the application temperature signal to calibrate the application temperature sensor.

2. The integrated circuit of claim 1, wherein
the calibration temperature sensitive element includes one or more bipolar junction transistors (BJTs) configured to output a calibration temperature signal.

3. The integrated circuit of claim 1, wherein the application temperature sensor comprises an application temperature sensitive element, wherein the calibration temperature sensitive element and the application temperature sensitive element are different types of temperature sensitive element.

4. The integrated circuit of claim 3, wherein the application temperature sensor includes a Wien Bridge circuit.

5. The integrated circuit of claim 3; wherein the application temperature sensitive element comprises any of:
one or more resistors;
one or more thermocouples;
one or more BJTs;
one or more MOSFETs; or
one or more thermal diffusivity temperature sensitive elements.

6. The integrated circuit of claim 1, wherein the calibration temperature sensitive element is suitable for measuring temperature with at least one of: a relatively high accuracy; a relatively high precision; a relatively high resolution, without requiring calibration.

7. The integrated circuit of claim 1, wherein the application temperature sensor includes a pair of bias current ratio-ed bipolar junction transistors (BJTs) configured to output the application temperature signal.

8. The integrated circuit of claim 1, further comprising:
a calibration bias circuit coupled to the calibration temperature sensitive element for applying a bias signal to the calibration temperature sensitive element to excite a temperature dependent characteristic of the calibration temperature sensitive element.

9. The integrated circuit of claim 1, further comprising a bias terminal coupled to the calibration temperature sensitive element for use in applying a bias signal to the calibration temperature sensitive element to excite a temperature dependent characteristic of the calibration temperature sensitive element.

10. The integrated circuit of claim 8, further comprising:
a calibration measurement module configured to generate a raw calibration temperature signal indicative of a temperature based on a measurement of a temperature dependent characteristic of the calibration temperature sensitive element, wherein a calibration temperature measurement is derived from the raw calibration temperature signal.

11. The integrated circuit of claim 10, further configured to output the raw calibration temperature signal.

12. The integrated circuit of claim 10, further comprising:
a calibration correction module coupled to the calibration measurement module, wherein the calibration correction module is configured to:
receive the raw calibration temperature signal; and
generate a corrected calibration temperature signal by applying predetermined correction data to the raw calibration temperature signal wherein a calibration temperature measurement is determined using the raw calibration temperature signal;
wherein the integrated circuit is further configured to output the corrected calibration temperature signal.

13. The integrated circuit of claim 1, further including:
a compensation module configured to generate a compensation signal using the calibration temperature signal; and
wherein the application correction module is further configured to:
receive the compensation signal; and
determine the correction factor based at least in part on the compensation signal.

14. The integrated circuit of claim 13, wherein the application temperature sensor further comprises:
an application measurement module configured to generate a raw application temperature signal indicative of a temperature based on an output of an application temperature sensitive element of the application temperature sensor,
and wherein the application temperature sensor is configured to generate the application temperature signal based at least in part on the correction factor, the compensation signal and the raw application temperature signal.

15. The integrated circuit of claim 14, wherein the application correction module is configured to:
receive the compensation signal and the raw application temperature signal; and
generate the application temperature signal based at least in part on the correction factor, the compensation signal and the raw application temperature signal.

16. The integrated circuit of claim 1, further comprising a compensation module configured to generate a compensation signal based at least in part on the temperature measurement performed using the calibration temperature sensitive element.

17. The integrated circuit of claim 1, further comprising:
a calibration temperature sensitive element characterisation structure configured to determine characterisation measurements for the calibration temperature sensitive element.

18. A method of calibrating an application temperature sensor implemented in an integrated circuit, the method comprising:
determining a plurality of calibration temperature measurements generated using a calibration temperature sensitive element implemented in the integrated circuit, wherein a first calibration temperature measurement is determined by applying a first bias signal to the calibration temperature sensitive element to excite a temperature dependent characteristic of the calibration temperature sensitive element at a first power level, and wherein a second calibration temperature measurement is determined by applying a second bias signal to the calibration temperature sensitive element to excite a temperature dependent characteristic of the calibration temperature sensitive element at a second power level, and wherein the first power level is different to the second power level;

determining one or more correction factors based at least in part on the first and second calibration temperature measurements; and applying the one or more correction factors to an output signal of the application temperature sensor to calibrate the application temperature sensor.

19. The method of claim 18, wherein determining the plurality of calibration temperature measurements is performed within the integrated circuit.

\* \* \* \* \*